(12) United States Patent
Fang et al.

(10) Patent No.: US 11,813,585 B2
(45) Date of Patent: Nov. 14, 2023

(54) WET GRANULATOR

(71) Applicant: ZHEJIANG CANAAN TECHNOLOGY LIMITED, Wenzhou (CN)

(72) Inventors: Zheng Fang, Wenzhou (CN); Lei Zhang, Wenzhou (CN); Pengsheng Lian, Wenzhou (CN); Wutong Wu, Wenzhou (CN); Huafeng Dai, Wenzhou (CN)

(73) Assignee: ZHEJIANG CANAAN TECHNOLOGY LIMITED, Wenzhou (CN)

( * ) Notice: Subject to any disclaimer, the term of this patent is extended or adjusted under 35 U.S.C. 154(b) by 678 days.

(21) Appl. No.: 16/979,176

(22) PCT Filed: Jan. 10, 2020

(86) PCT No.: PCT/CN2020/071456
§ 371 (c)(1),
(2) Date: Sep. 9, 2020

(87) PCT Pub. No.: WO2020/192249
PCT Pub. Date: Oct. 1, 2020

(65) Prior Publication Data
US 2021/0245125 A1  Aug. 12, 2021

(30) Foreign Application Priority Data

Mar. 28, 2019 (CN) .......................... 201910242825.7

(51) Int. Cl.
*B01J 2/10* (2006.01)
*B01J 2/00* (2006.01)
*B05C 11/00* (2006.01)

(52) U.S. Cl.
CPC . *B01J 2/10* (2013.01); *B01J 2/00* (2013.01); *B05C 11/00* (2013.01)

(58) Field of Classification Search
CPC ................ B01J 2/10; B01J 2/00; B05C 11/00
See application file for complete search history.

(56) References Cited

U.S. PATENT DOCUMENTS

| 6,085,935 A | 7/2000 | Malchow et al. |
| 2016/0215546 A1* | 7/2016 | Decker ...................... B01J 2/10 |

FOREIGN PATENT DOCUMENTS

| CN | 207042430 U | 2/2018 |
| CN | 110038482 A | 7/2019 |
| JP | 5747496 Y2 | 10/1982 |

* cited by examiner

*Primary Examiner* — Nahida Sultana
(74) *Attorney, Agent, or Firm* — Bayramoglu Law Offices LLC

(57) ABSTRACT

A wet granulator includes a material cylinder. A cylinder cover is rotatably arranged at an opening of the material cylinder, and a locking member is arranged on the cylinder cover. The locking member includes a locking housing, and the locking housing is provided with a first through groove. A locking pin slides in the first through groove, and the locking pin includes a middle rod and a contacting rod. A first end of the contacting rod is connected to a first end of the middle rod to form a contacting platform, and a second end of the contacting rod extends out of the first through groove. The first end of the middle rod is arranged in the first through groove, and a second end of the middle rod extends out of the first through groove. The second end of the middle rod is provided with a pin head.

8 Claims, 10 Drawing Sheets

WET GRANULATOR

CROSS REFERENCE TO THE RELATED APPLICATIONS

This application is the national phase entry of International Application No. PCT/CN2020/071456, filed on Jan. 10, 2020, which is based upon and claims priority to Chinese Patent Application No. 201910242825.7, filed on Mar. 28, 2019, the entire contents of which are incorporated herein by reference.

TECHNICAL FIELD

The present invention relates to the technical field of granulation equipment, in particular to a wet granulator.

BACKGROUND

The wet granulation method is a granulation method in which the solution, solid-liquid mixture, air-liquid mixture and other raw materials are chemically reacted to form a block and then the block is ground into granular powder. In the process of the wet granulation method, time for mixing dry powder is short, so it is widely used in industrial granulation. The wet granulator is adopted in the wet granulation method, and provided with a material cylinder that is a carrier for materials during stirring. When the material is stirred in the wet granulator, the cylinder cover of the material cylinder needs to be closed to keep the material from being leaked. However, the locking structure of the cylinder cover in the prior art is relatively complex and inconvenient to use. Moreover, due to poor locking stability the locked cylinder cover is likely to be opened when the material in the material cylinder explodes.

SUMMARY

In view of the disadvantages of the prior art, the present invention provides a wet granulator, which has a simple structure, is convenient to operate, and has a strong explosion resistance.

The present invention discloses a wet granulator, including a material cylinder. A cylinder cover is rotatably arranged at an opening of the material cylinder, and a locking member is arranged on the cylinder cover. The locking member includes a locking housing, and the locking housing is provided with a first through groove. A locking pin slides in the first through groove, and the locking pin includes a middle rod and a contacting rod. One end of the contacting rod is connected to one end of the middle rod to form a contacting platform, and the other end of the contacting rod extends out of the first through groove. One end of the middle rod is arranged in the first through groove, and the other end of the middle rod extends out of the first through groove. The other end of the middle rod extending out of the first through groove is provided with a pin head, and a diameter of the pin head is larger than a diameter of the first through groove. A reset spring is sleeved on the middle rod. A contacting step is arranged inside the first through groove. One end of the reset spring is fixedly installed on the contacting step, and the other end of the reset spring is arranged in contact with the contacting platform to form a linkage between the locking pin and the reset spring. A force caused by the weight of the locking pin is less than a reset elastic force of the reset spring, so that the locking pin is fixed on the first through groove. A contacting block is arranged at the opening of the material cylinder, and the contacting block is provided with a continuous slope surface. The slope surface is arranged toward a movement direction of the locking member, and the locking pin is arranged in alignment with the slope surface. The locking member rotates to contact the contacting block so that the locking pin can slide in the first through groove.

The advantages of this setting are as follows: in the above solution, when the cylinder cover is locked, the cylinder cover is operated to rotate, and the locking member on the cylinder cover rotates with the cylinder cover to contact the contacting block. When the locking member contacts the contacting block, the locking pin on the locking member contacts the slope surface, so that the locking pin slides. After the locking pin slides, the contacting platform slides with the locking pin so as to compress the reset spring. Then, the locking pin leaves the slope surface with the rotation of the cylinder cover. After the locking pin leaves the slope surface, the reset spring resets the locking pin, so as to fix the locking pin on the opposite side of the slope surface of the contacting block. This locking structure is relatively simple and is convenient to construct. Since the contacting block and the locking pin are made of a rigid material with relatively high strength, the cylinder cover has better locking stability than prior art devices even if an explosion occurs when the locking pin is fixed on the contacting block. Since the pin head is fixedly connected to the middle rod, when the cylinder cover is required to be opened, the user only needs to manually pull the pin head to cause the locking pin to slide, so that the slope surface moves from contact with the locking pin, and the cylinder cover is able to rotate freely. With the locking pin so positioned, the cylinder cover can be rotated and opened. This operation is convenient and fast, which saves time for opening the cylinder cover. The force caused by the weight of the locking pin is less than the reset elastic force of the reset spring, ensuring that the locking pin will not fall from the slide groove, resulting in great stability.

Further, a side wall of the material cylinder is provided with a platform along the horizontal direction of the material cylinder, and a turntable rotating along the horizontal direction of the material cylinder is arranged on the platform. The cylinder cover is arranged on the turntable and is caused to swing by a rotating shaft, so that the cylinder cover can rotate along the horizontal direction of the material cylinder. The rotating shaft is arranged along the height direction of the material cylinder to swing to open and close the cylinder cover at the opening of the material cylinder.

The advantages of this setting are as follows: in the above solution, during the granulation process, the operator often needs to open the cylinder cover to observe the status of granulation in the material cylinder. However, in the granulation process, because the temperature in the material cylinder is relatively high, it will cause the air pressure in the material cylinder to be less than the external pressure. When the operator opens the cylinder cover directly upward, the opening of the material cylinder is directly exposed to the air, causing a great difference between the internal pressure and the external pressure of the material cylinder in a short time, so that the material in the material cylinder is stressed because of the pressure difference, which may cause the material to explode and endanger the personal safety of the operator. However, for the present wet granulator, in the process of opening the cylinder cover, the cylinder cover first can be operated to slowly rotate at a certain angle in the horizontal direction through the mechanism of the cylinder cover, so as to cause the opening of the material cylinder gradually to be exposed to the air. After a period of time, the cylinder cover is opened upward when the internal pressure and the external pressure of the material cylinder is balanced, thereby avoiding the explosion of the material in the material cylinder due to the external and internal air pressures reaching equilibrium thus reducing the potential safety hazard.

Further, the material cylinder is provided with a material discharge port. The material discharge port is hinged with a material discharge valve, and the material discharge valve is connected to a material discharge device. The material discharge device includes a first driving cylinder. The first driving cylinder includes a cylinder body, a locking piston rod and a pressure piston rod, wherein the locking piston rod and the pressure piston rod slide on the cylinder body. One end of the locking piston rod is connected to one end of the pressure piston rod, the other end of the locking piston rod extends out of the cylinder body. The cylinder body is provided with a first air intake slot at a position close to the pressure piston rod. A first end of the first air intake slot communicates with the pressure piston rod, and a second end of the first air intake slot communicates with an external air delivery device to form a closed air intake cavity. The other end of the pressure piston rod extending out of the cylinder body is arranged to press against the material discharge valve. The cylinder body is provided with a second air intake slot at a position close to the locking piston rod. One end of the second air intake slot communicates with the locking piston rod, and the other end of the second air intake slot communicates with the external air delivery device to form a closed air delivery cavity. A locking base for locking the locking piston rod is provided at the end of the locking piston rod positioned away from the second air intake slot.

The advantages of this setting are as follows: in the above solution, when the material in the material cylinder is stirred, the external air delivery device delivers the air to the first air intake slot so that the pressure piston rod extends out and presses against the material discharge valve, and the locking base locks the locking piston rod. Since the pressure piston rod is rigidly connected to the locking piston rod, when the locking base locks the locking piston rod, the pressure piston rod is maintained in a pressing configuration against the material discharge valve, so as to keep the material discharge valve locked. Because of the locking of the locking base, even if the material in the material cylinder explodes, the impact force of the explosion of the material will not open the material discharge valve. In this way, the explosion pressure and the material cannot be released along the material discharge port to the downstream process/equipment, thereby ensuring the safety of the operator and the downstream process and improving the explosion resistance. When the material needs to be normally released from the material discharge valve at the end of the stirring of the material, the locking base first unlocks the locking piston rod, and then the external air delivery device delivers the air to the second air intake slot, and the pressure piston rod slides to the side of the locking base, thereby relieving the pressure on the material discharge valve, and releasing the material normally from the material discharge port. Then, the next step of processing proceeds. This structure not only improves the overall explosion resistance of the structure of the material discharge port, but also ensures that the material discharge port can operate normally.

Further, the locking base is provided with a second through groove for enabling the locking piston rod to pass through to cause the pressure piston rod to unlock the material discharge valve, and the locking piston rod is arranged in alignment with the second through groove. A locking block slides in the locking base at the position corresponding to the second through groove, and the locking block shields the second through groove when the material discharge valve is locked.

The advantages of this setting are as follows: in the above solution, when the material in the material cylinder is stirred, it is only necessary to operate the locking block to shield the second through groove. In this way, the locking piston rod is locked by the locking block and cannot smoothly pass through the second through groove, so that the pressure piston rod is maintained in a state of pressing against the material discharge valve and complete the locking of the material discharge valve. When the material needs to be normally released from the material discharge valve at the end of the stirring of the material, it is only necessary to operate the locking block to slide, so as to remove the shielding to the second through groove. After that, the locking piston rod can smoothly pass through the second through groove, and then the external air delivery device delivers the air to the second air intake slot to cause the pressure piston rod slide to the side of the locking base, so that the pressure piston rod releases the locking of the material discharge valve, and the material discharge valve can be opened normally. The locking device has the advantages of a simple structure with great stability, that is convenient to construct and is easy to operate.

Further, a slide groove is arranged in the locking base along the direction perpendicular to the second through groove, and the slide groove is arranged along the height direction of the locking base. A second driving cylinder is arranged in the slide groove. The output end of the second driving cylinder is connected to the locking block sliding along the height direction of the locking base. The second driving cylinder drives the locking block to slide, and causes the locking block to shield the second through groove.

The advantages of this setting are as follows: in the above solution, the slide groove is arranged perpendicular to the second through groove and along the height direction of the locking base, and the locking block is driven by the second driving cylinder to slide in the slide groove, so that the locking block shields the second through groove more accurately. The second driving cylinder is configured to cause the locking block slide more smoothly and quickly. In addition, since the driving cylinder has a strong driving force, the overall locking structure locks the locking piston rod more stably.

Further, the material discharge port is arranged between the material cylinder and the side wall, and a cross section of the material discharge port is in a cone shape with a cone angle of 80°. A central axis of the material discharge port forms an angle of 14.7° relative to the horizontal direction of the material cylinder.

The advantages of this setting are as follows: in the above solution, the material discharge port is configured to ensure that the material can be released quickly and orderly from the material discharge port after the end of stirring, thereby avoiding the explosion of the material due to accumulation during the release.

DETAILED DESCRIPTION OF THE EMBODIMENTS

Figure 1:
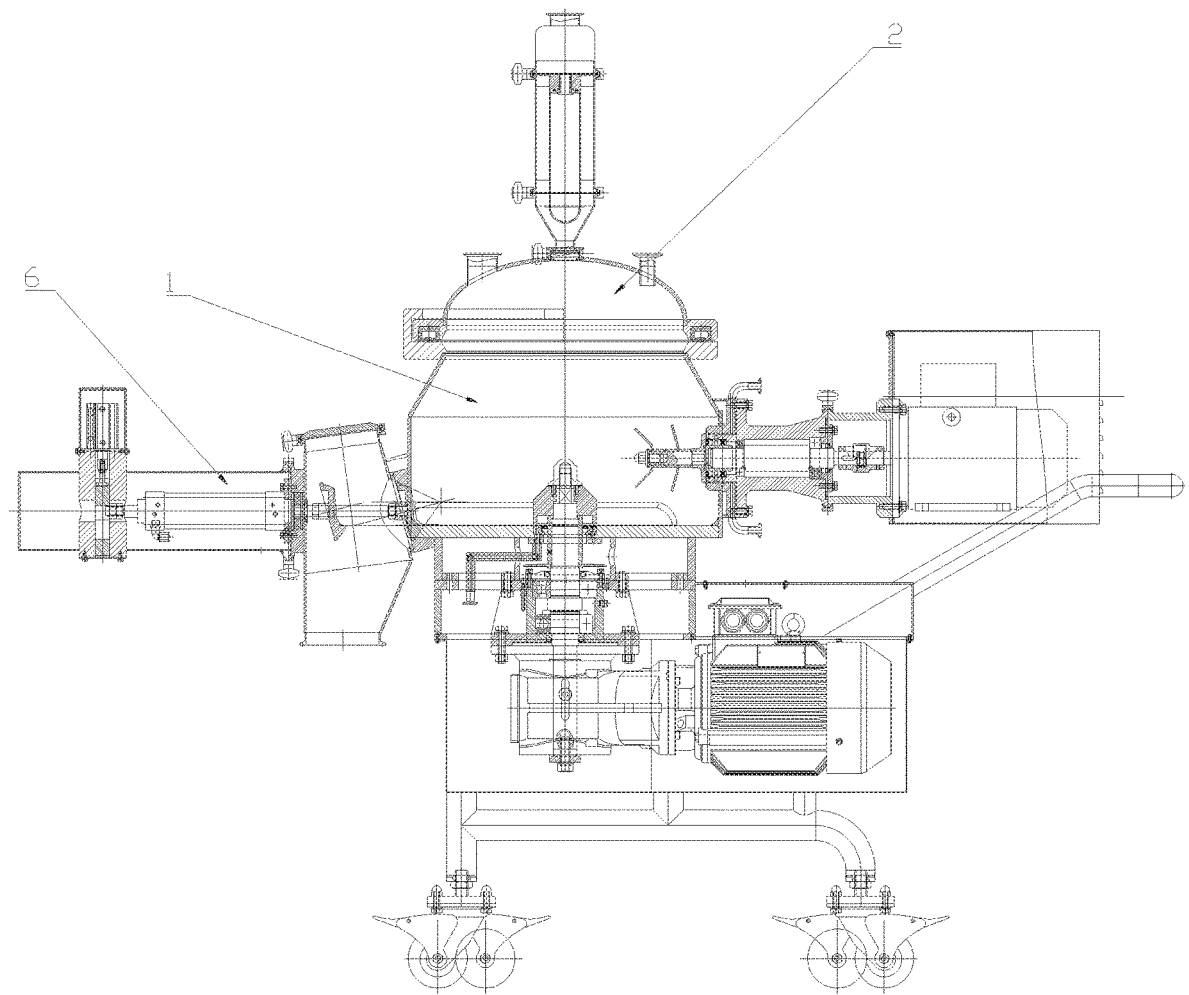
FIG. 1 is a schematic diagram showing the overall structure of an embodiment of the present invention.
Figure 2:
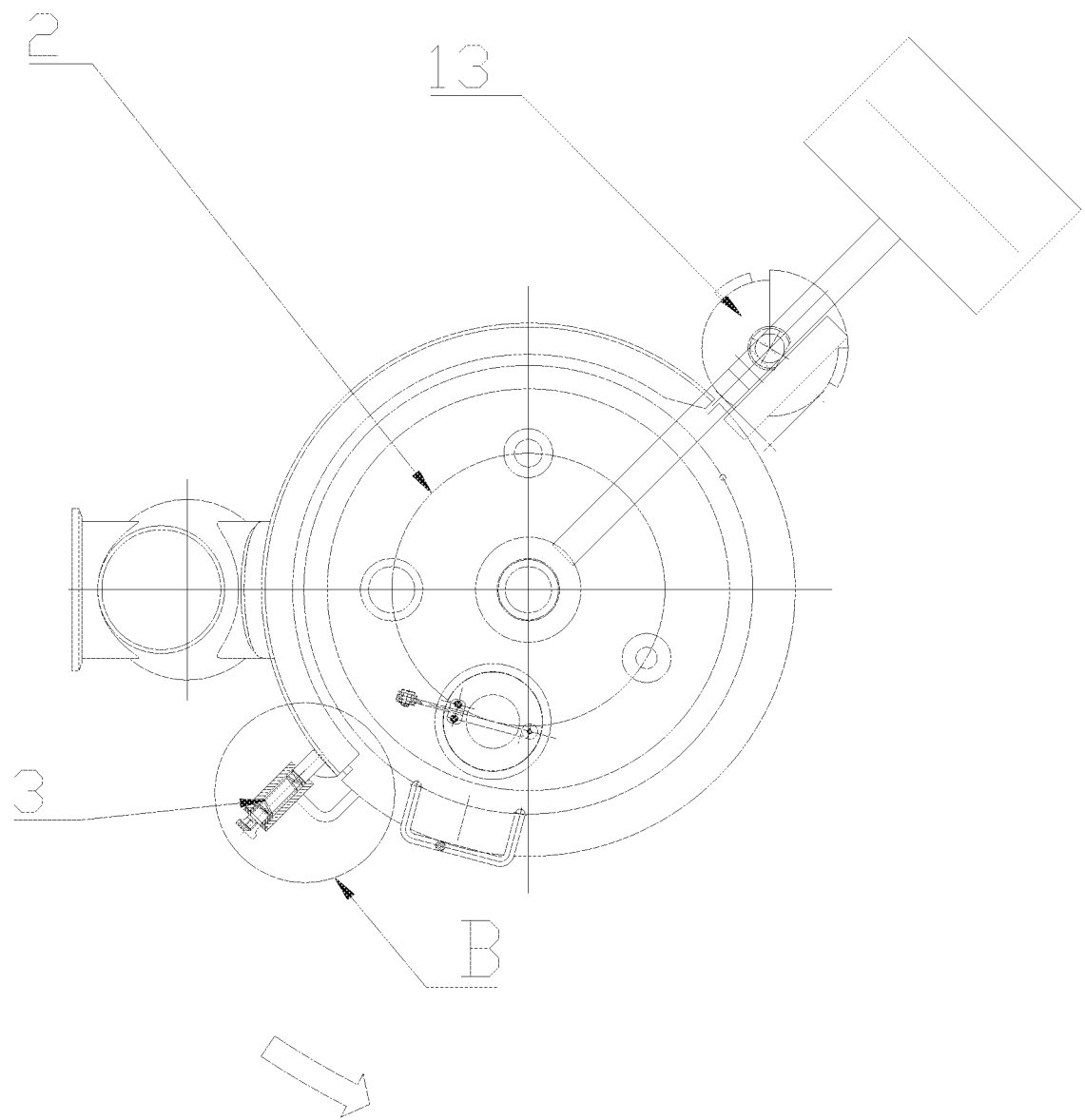
FIG. 2 is a first diagram of the embodiment showing the cylinder cover in an opened state.
Figure 3:
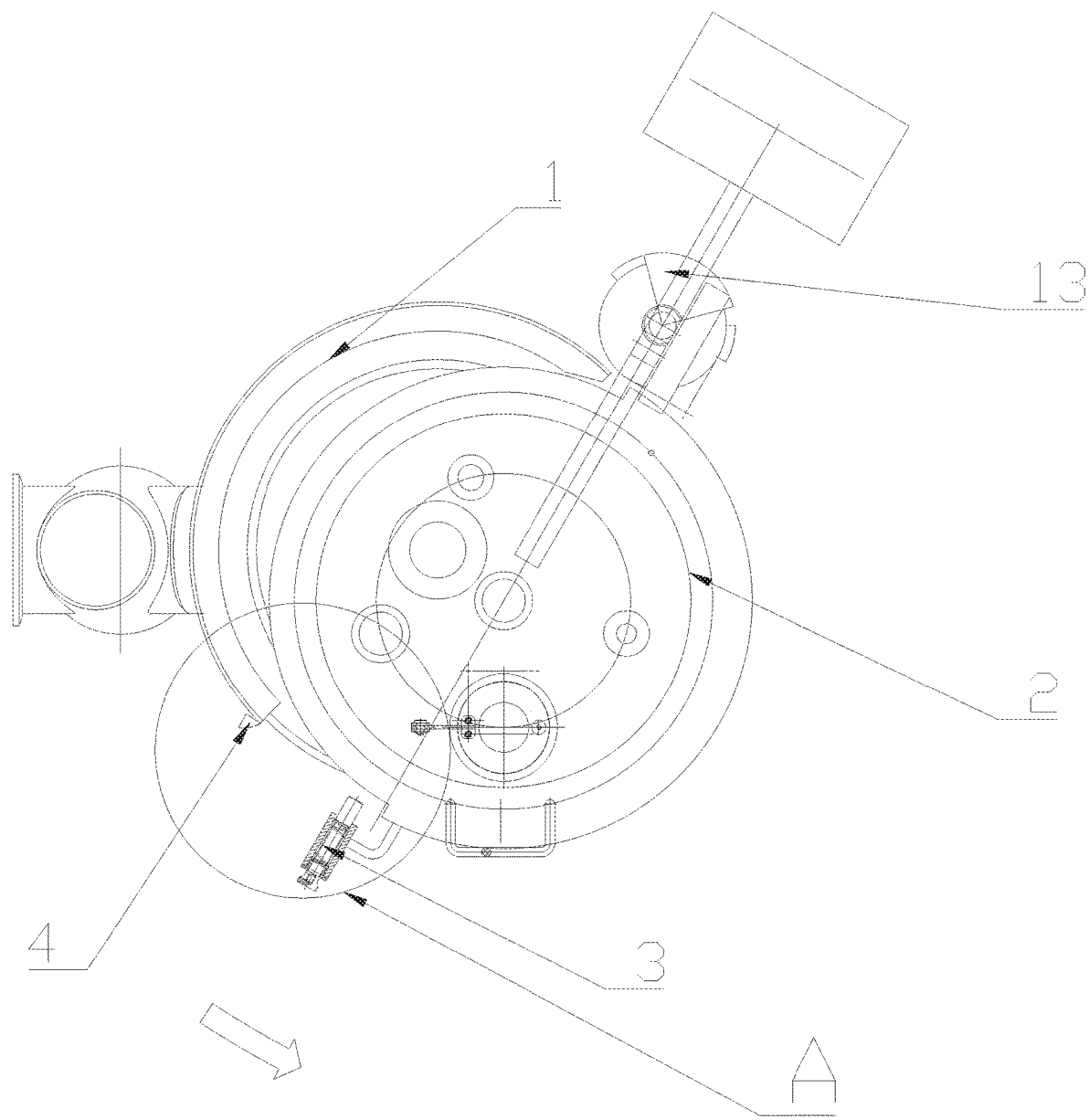
FIG. 3 is a second diagram of the embodiment showing the cylinder cover in an opened state.
Figure 4:
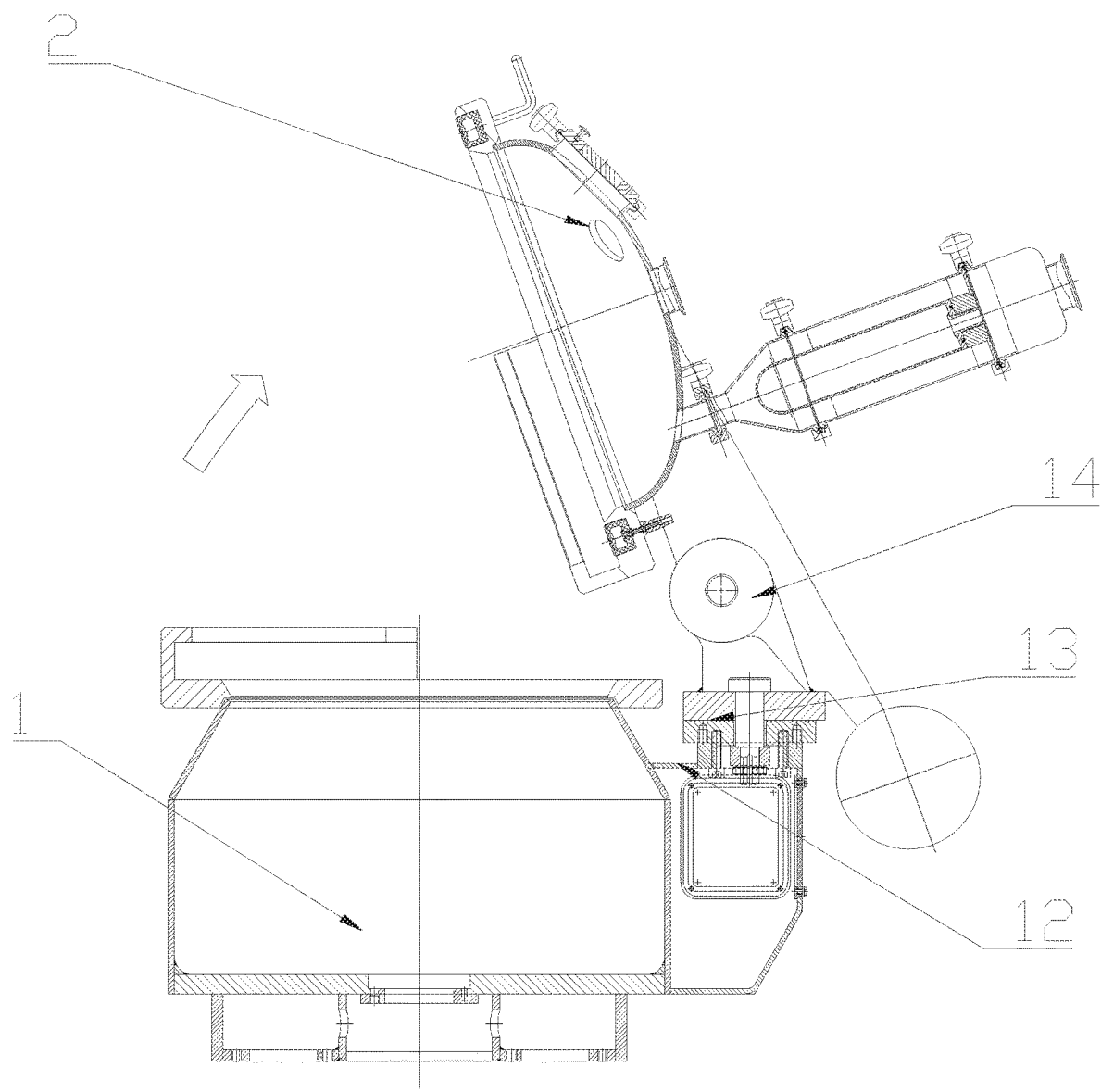
FIG. 4 is a third diagram of the embodiment showing the cylinder cover in an opened state.
Figure 5:
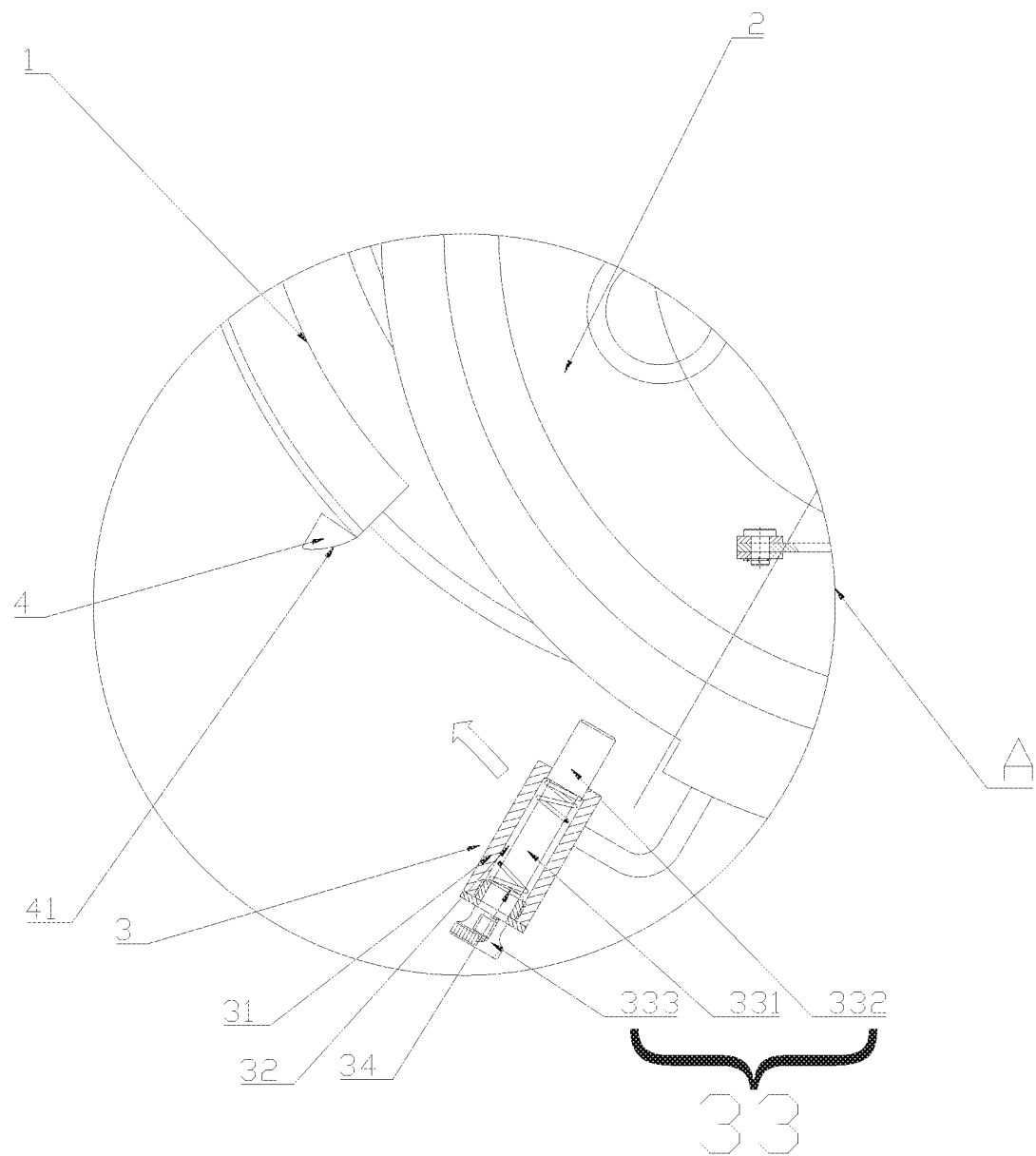
FIG. 5 is an enlarged view of part A of FIG. 3 according to the embodiment of the present invention.
Figure 6:
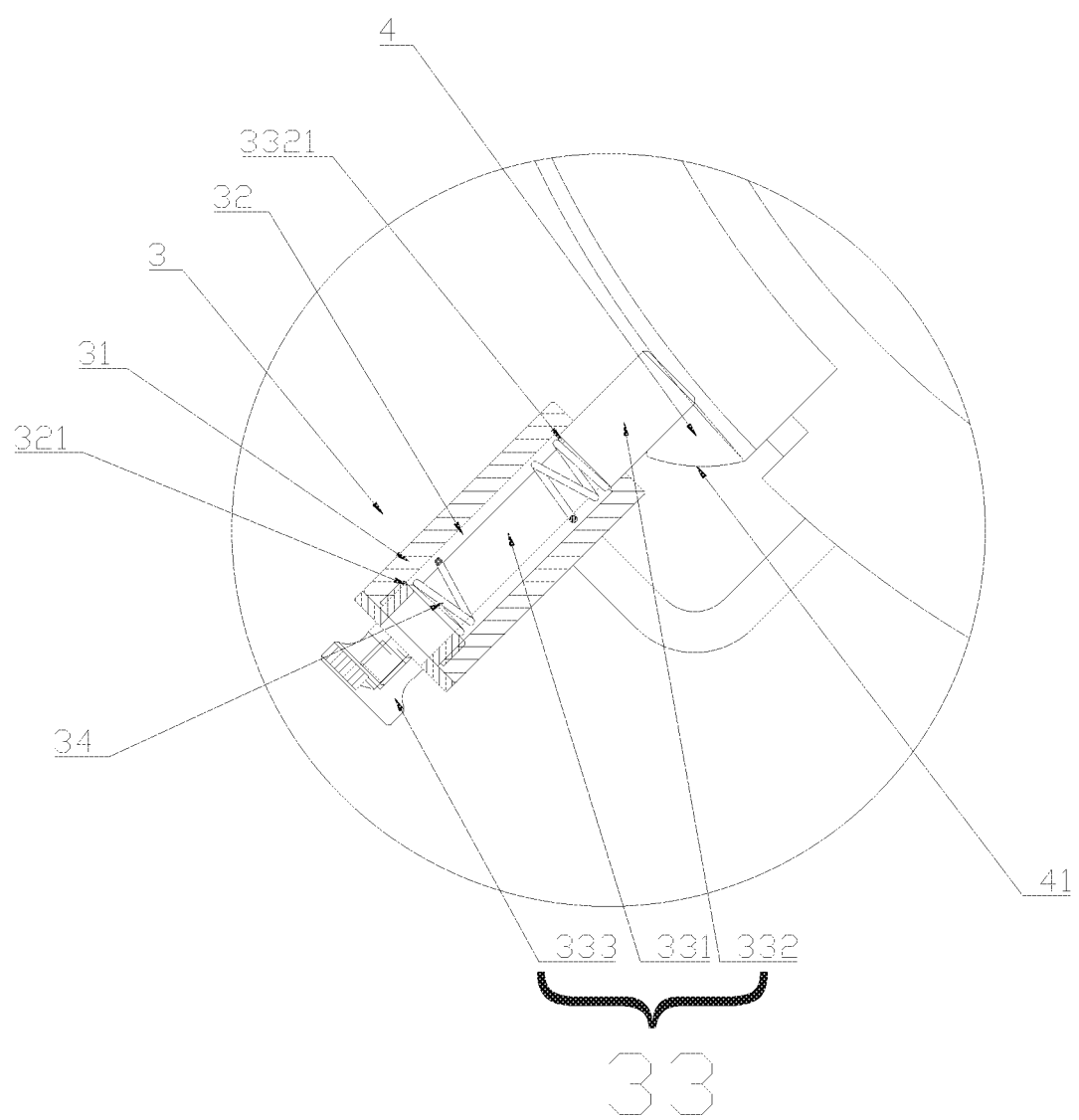
FIG. 6 is an enlarged view of part B of FIG. 2 according to the embodiment of the present invention.
Figure 7:
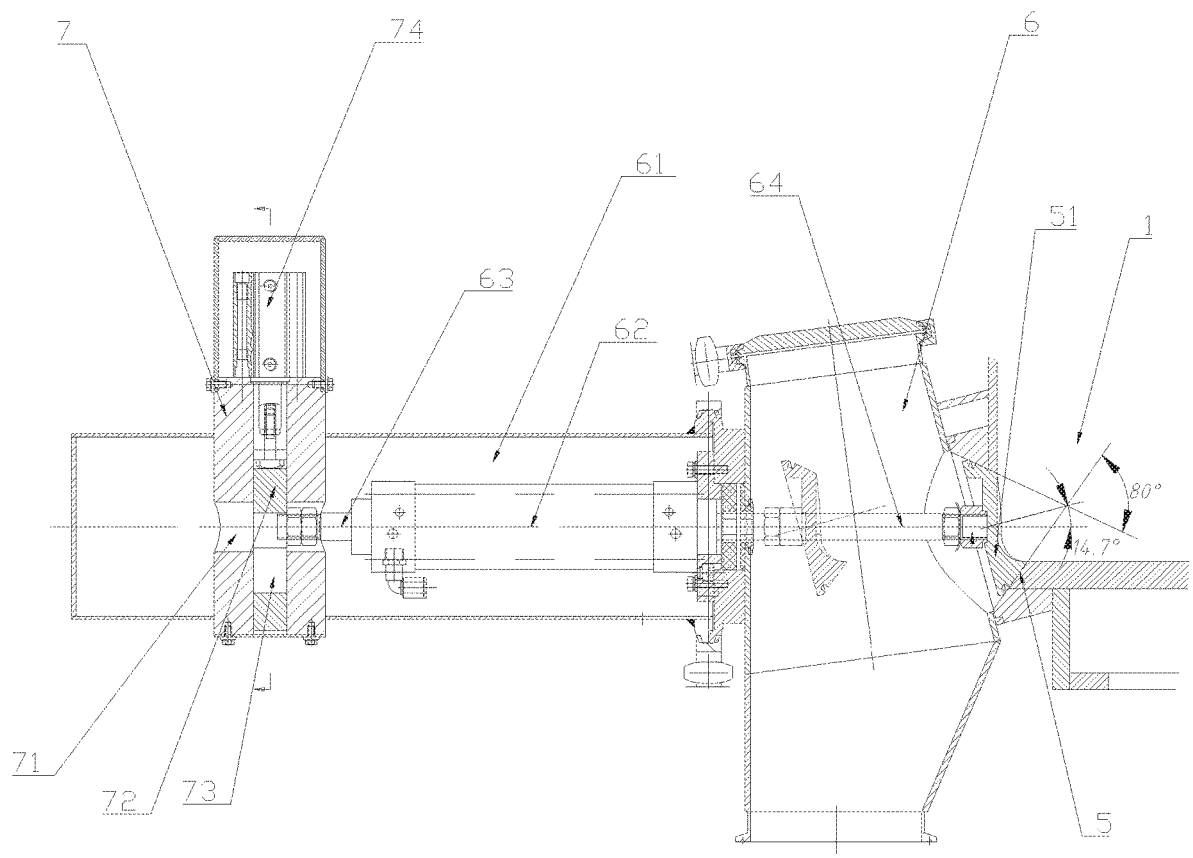
FIG. 7 is a schematic diagram showing the structure of the material discharge device in the embodiment of the present invention.
Figure 8:
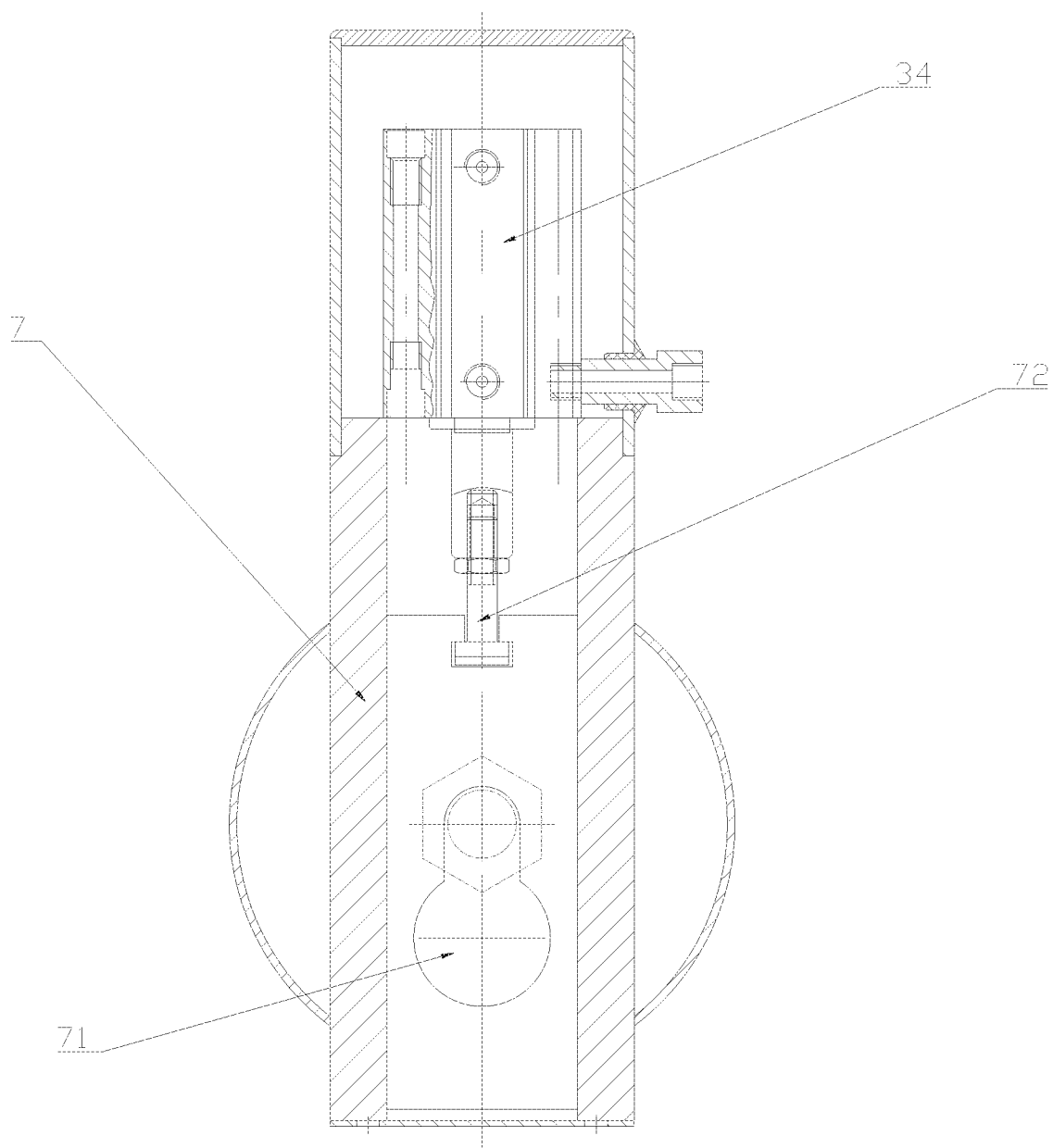
FIG. 8 is a schematic diagram showing the locking base in the embodiment of the present invention.
Figure 9:
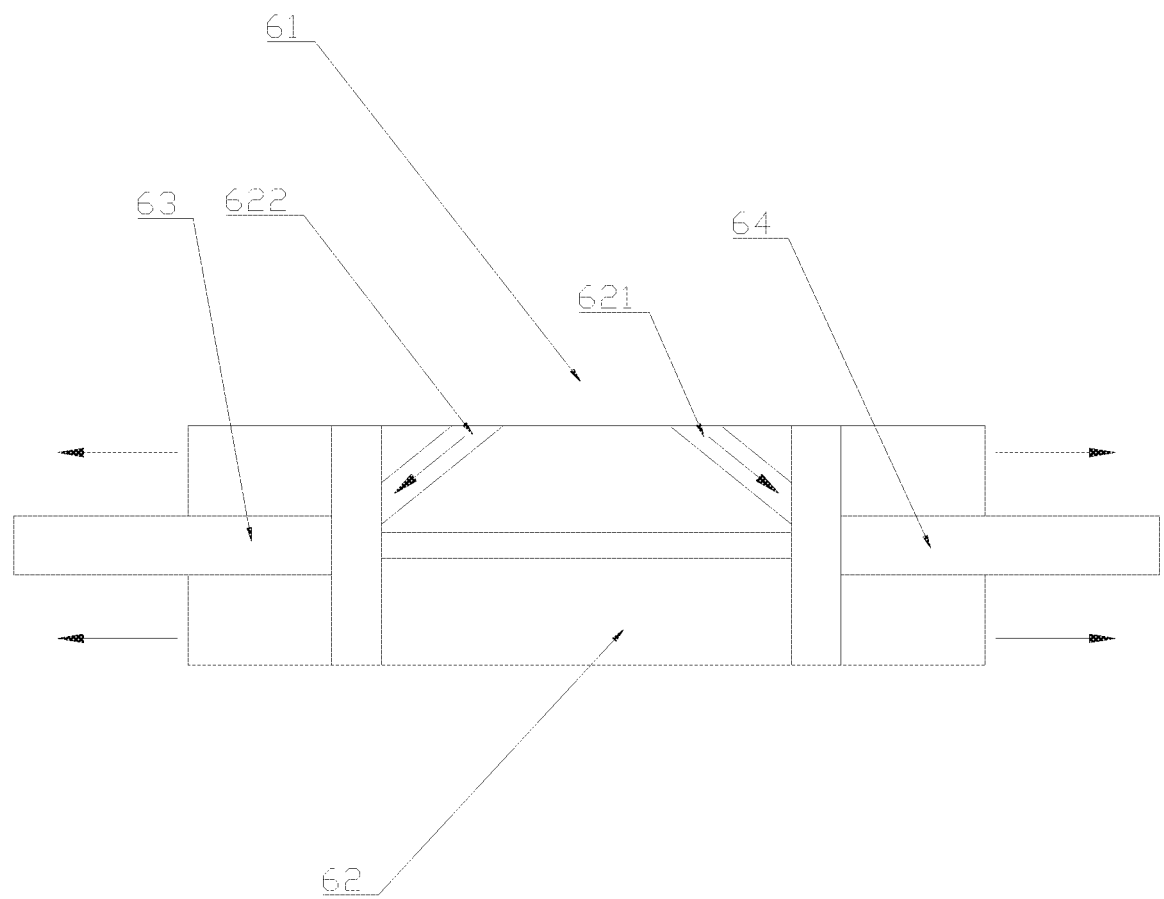
FIG. 9 is a schematic diagram showing the first driving cylinder in the embodiment of the present invention.
Figure 10:
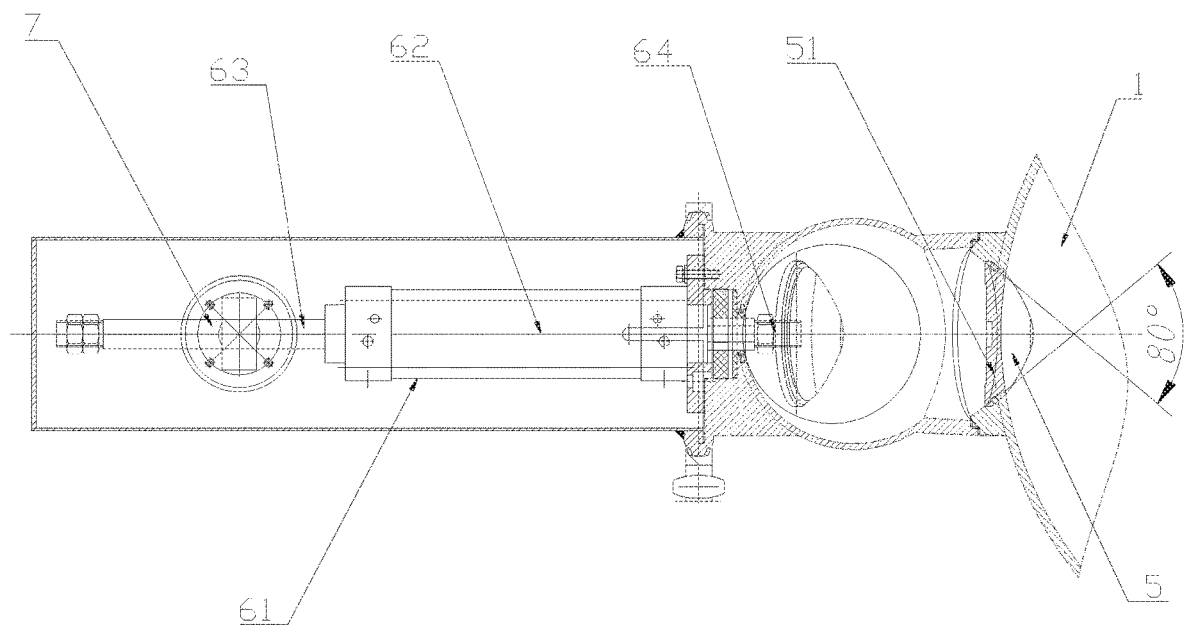
FIG. 10 is a top view showing the overall structure of the embodiment of the present invention.

Referring to FIGS. 1 to 10, the present invention discloses a wet granulator, including the material cylinder 1. The cylinder cover 2 is rotatably arranged at the opening of the material cylinder 1, and the locking member 3 is arranged on the cylinder cover 2. The locking member 3 includes the locking housing 31, and the locking housing 31 is provided with the first through groove 32. The locking pin 33 slides in the first through groove 32, and the locking pin 33 includes the middle rod 331 and the contacting rod 332. One end of the contacting rod 332 is connected to one end of the middle rod 331 to form the contacting platform 3321, and the other end of the contacting rod 332 extends out of the first through groove 32. One end of the middle rod 331 is arranged in the first through groove 32, and the other end of the middle rod 331 extends out of the first through groove 32. The other end of the middle rod 331 extending out of the first through groove 32 is provided with the pin head 333, and the diameter of the pin head 333 is larger than the diameter of the first through groove 32. The reset spring 34 is sleeved on the middle rod 331. The contacting step 321 is arranged inside the first through groove 32. One end of the reset spring 34 is fixedly installed on the contacting step 321, and the other end of the reset spring 34 is arranged in contact with the contacting platform 3321 to form the linkage between the locking pin 33 and the reset spring 34. The force caused by the weight of the locking pin 33 is less than the reset elastic force of the reset spring 34 to cause the fixation of the locking pin 33 on the first through groove 32. The contacting block 4 is arranged at the opening of the material cylinder 1, and the contacting block 4 is provided with the continuous slope surface 41. The slope surface 41 is arranged toward the movement direction of the locking member 3, and the locking pin 33 is arranged in alignment with the slope surface 41. The locking member 3 rotates to contact the contacting block 4 so as to realize the sliding of the locking pin 33 in the first through groove 32. When the cylinder cover 2 is locked, the cylinder cover 2 is operated to rotate, and the locking member 3 on the cylinder cover 2 rotates with the cylinder cover 2 to contact the contacting block 4. When the locking member 3 contacts the contacting block 4, the locking pin 33 on the locking member 3 contacts the slope surface 41, resulting in the sliding of the locking pin 33. After the locking pin 33 slides, the contacting platform 3321 slides with the locking pin 33 so as to compress the reset spring 34. Then, the locking pin 33 leaves the slope surface 41 with the rotation of the cylinder cover 2. After the locking pin 33 leaves the slope surface 41, the reset spring 34 resets the locking pin 33, so as to fix the locking pin 33 on the opposite side of the slope surface 41 of the contacting block 4. This locking structure is relatively simple and is convenient to construct. Since the contacting block 4 and the locking pin 33 are made of a rigid material with relatively high strength, the cylinder cover 2 has better locking stability than prior art devices even if an explosion occurs when the locking pin 33 is fixed on the contacting block 4. Since the pin head 333 is fixedly connected to the middle rod 331, when the cylinder cover 2 is required to be opened, the user only needs to manually pull the pin head 333 to cause the locking pin 33 to slide, so that the slope surface 41 moves from contact with the locking pin 33, and the cylinder cover 2 is able to rotate freely. With the locking pin so positioned, the cylinder cover 2 can be rotated and opened. This operation is convenient and fast, which saves time for opening the cylinder cover. The force caused by the weight of the locking pin 33 is less than the reset elastic force of the reset spring 34, ensuring that the locking pin 33 will not fall from the slide groove, resulting in great stability.

The side wall of the material cylinder 1 is provided with the platform 12 along the horizontal direction of the material cylinder 1, and the turntable 13 rotating along the horizontal direction of the material cylinder 1 is arranged on the platform 12. The cylinder cover 2 is arranged on the turntable 13 and is caused to swing by the rotating shaft 14, so that the cylinder cover 2 can rotate along the horizontal direction of the material cylinder 1. The rotating shaft 14 is arranged along the height direction of the material cylinder 1 to swing to open and close the cylinder cover 2 at the opening of the material cylinder 1. The advantages of this setting are as follows: in the above solution, during the granulation process, the operator often needs to open the cylinder cover 2 to observe the status of granulation in the material cylinder 1. However, in the granulation process, because the temperature in the material cylinder 1 is relatively high, it will cause the air pressure in the material cylinder 1 to be less than the external pressure. When the operator opens the cylinder cover 2 directly upward, the opening of the material cylinder 1 is directly exposed to the air, causing a great difference between the internal pressure and the external pressure of the material cylinder 1 in a short time, so that the material in the material cylinder 1 is stressed because of the pressure difference, which may cause the material to explode and endanger the personal safety of the operator. However, for the present wet granulator, in the process of opening the cylinder cover 2, the cylinder cover 2 first can be operated to slowly rotate at a certain angle in the horizontal direction through the mechanism of the cylinder cover 2 to cause the opening of the material cylinder 1 to gradually be exposed to the air, and after a period of time, the cylinder cover 2 is opened upward when the internal pressure and the external pressure of the material cylinder 1 is balanced, thereby avoiding the explosion of the material in the material cylinder due to the external and internal air pressures reaching equilibrium thus reducing the potential safety hazard.

The material cylinder 1 is provided with the material discharge port 5. The material discharge port 5 is hinged with the material discharge valve 51, and the material discharge valve 51 is connected to the material discharge device 6. The material discharge device 6 includes the first driving cylinder 61. The first driving cylinder 61 includes the cylinder body 62, the locking piston rod 63 and the pressure piston rod 64, wherein the locking piston rod 63 and the pressure piston rod 64 slide on the cylinder body 62.

One end of the locking piston rod 63 is connected to one end of the pressure piston rod 64, the other end of the locking piston rod 63 extends out of the cylinder body 62. The cylinder body 62 is provided with the first air intake slot 621 at the position close to the pressure piston rod 64. One end of the first air intake slot 621 communicates with the pressure piston rod 64, and the other end of the first air intake slot 621 communicates with the external air delivery device to form the closed air intake cavity. The other end of the pressure piston rod 64 extending out of the cylinder body 62 is arranged to press against the material discharge valve 51. The cylinder body 62 is provided with the second air intake slot 622 at the position close to the locking piston rod 63. One end of the second air intake slot 622 communicates with the locking piston rod 63, and the other end of the second air intake slot 622 communicates with the external air delivery device to form the closed air delivery cavity. The locking base 7 for locking the locking piston rod 63 is provided at the end of the locking piston rod 63 positioned away from the second air intake slot 622. The advantages of this setting are as follows: in the above solution, when the material in the material cylinder 1 is stirred, the external air delivery device delivers the air to the first air intake slot 621 so that the pressure piston rod 64 extends out and presses against the material discharge valve 51, and the locking base 7 locks the locking piston rod 63. Since the pressure piston rod 64 is rigidly connected to the locking piston rod 63, when the locking base 7 locks the locking piston rod 63, the pressure piston rod 64 is maintained in a pressing configuration against the material discharge valve 51, so as to keep the material discharge valve 51 locked. Because of the locking of the locking base 7, even if the material in the material cylinder 1 explodes, the impact force of the explosion of the material will not open the material discharge valve 51. In this way, the explosion pressure and the material cannot be released along the material discharge port 5 to the downstream process/equipment, thereby ensuring the safety of the operator and the downstream process and improving the explosion resistance. When the material needs to be normally released from the material discharge valve 51 at the end of the stirring of the material, the locking base 7 first unlocks the locking piston rod 63, and then the external air delivery device delivers the air to the second air intake slot 622, and the pressure piston rod 64 slides to the side of the locking base 7, thereby relieving the pressure on the material discharge valve 51, and releasing the material normally from the material discharge port 5. Then, the step of further processing proceeds. This structure not only improves the overall explosion resistance of the structure of the material discharge port 5, but also ensures that the material discharge port 5 can operate normally.

The locking base 7 is provided with the second through groove 71 for enabling the locking piston rod 63 to pass through to cause the pressure piston rod 64 to unlock the material discharge valve 51, and the locking piston rod 63 is arranged in alignment with the second through groove 71. The locking block 72 slides in the locking base 7 at the position corresponding to the second through groove 71, and the locking block shields the second through groove 71 when the material discharge valve 51 is locked. The advantages of this setting are as follows: in the above solution, when the material in the material cylinder 1 is stirred, it is only necessary to operate the locking block 72 to shield the second through groove 71. In this way, the locking piston rod 63 is locked by the locking block 72 and cannot smoothly pass through the second through groove 71, so that the pressure piston rod 64 is maintained in a state of pressing against the material discharge valve 51 and complete the locking of the material discharge valve 51. When the material needs to be normally released from the material discharge valve 51 at the end of the stirring of the material, it is only necessary to operate the locking block 72 to slide, so as to remove the shielding to the second through groove 71. After that, the locking piston rod 63 can smoothly pass through the second through groove 71, and then the external air delivery device delivers the air to the second air intake slot 622 to cause the pressure piston rod 64 slide to the side of the locking base 7, so that the pressure piston rod 64 releases the locking of the material discharge valve 51, and the material discharge valve 51 can be opened normally. The locking device has the advantages of a simple structure with great stability, that is convenient to construct and is easy to operate.

The slide groove 73 is arranged in the locking base 7 along the direction perpendicular to the second through groove 71, and the slide groove 73 is arranged along the height direction of the locking base 7. The second driving cylinder 74 is arranged in the slide groove 73. The output end of the second driving cylinder 74 is connected to the locking block 72 sliding along the height direction of the locking base 7. The second driving cylinder 74 drives the locking block 72 to slide, and causes the locking block 72 to shield the second through groove 71. The advantages of this setting are as follows: in the above solution, the slide groove 73 is arranged perpendicular to the second through groove 71 and along the height direction of the locking base 7, and the locking block 72 is driven by the second driving cylinder 74 to slide in the slide groove 73, so that the locking block 72 shields the second through groove 71 more accurately. The second driving cylinder 74 is configured to cause the locking block 72 to slide more smoothly and quickly. In addition, since the driving cylinder has a strong driving force, the overall locking structure locks the locking piston rod 63 more stably.

The material discharge port 5 is arranged between the material cylinder 1 and the side wall, and the cross section of the material discharge port 5 is in a cone shape with a cone angle of 80°. A central axis of the material discharge port 5 forms an angle of 14.7° relative to the horizontal direction of the material cylinder 1. The advantages of this setting are as follows: in the above solution, the material discharge port 5 is configured to ensure that the material can be released quickly and orderly from the material discharge port 5 after the end of stirring, thereby avoiding the explosion of the material due to accumulation during the release.

The above embodiment is only a preferred embodiment of the present invention and cannot be used to limit the protective scope of the present invention. Therefore, the equivalent changes made according to the protective scope of the present invention, for example, equivalent products with such similar processes and similar structures shall fall within the protective scope of the present invention.

What is claimed is:

1. A wet granulator, comprising a material cylinder; wherein, a cylinder cover is rotatably arranged at an opening of the material cylinder, and a locking member is arranged on the cylinder cover; the locking member comprises a locking housing, and the locking housing is provided with a first through groove; a locking pin slides in the first through groove, and the locking pin comprises a middle rod and a contacting rod; a first end of the contacting rod is connected to a first end of the middle rod to form a contacting platform, and a second end of the contacting rod extends out of the first through groove; the first end of the middle rod is arranged in the first through groove, and a second end of the middle rod extends out of the first through groove; the second end of the middle rod is provided with a pin head, and a diameter of the pin head is larger than a diameter of the first through groove;

a reset spring is sleeved on the middle rod; a contacting step is arranged inside the first through groove; a first end of the reset spring is fixedly installed on the contacting step, and a second end of the reset spring is arranged in contact with the contacting platform to form a linkage between the locking pin and the reset spring; a force caused by a weight of the locking pin is less than a reset elastic force of the reset spring to fix the locking pin on the first through groove; and a contacting block is arranged at the opening of the material cylinder, and the contacting block is provided with a continuous slope surface; the continuous slope surface is arranged toward a movement direction of the locking member, and the locking pin is arranged in alignment with the continuous slope surface; the locking member rotates to contact the contacting block and drives the locking pin to slide in the first through groove.

2. The wet granulator according to claim 1, wherein, a side wall of the material cylinder is provided with a platform along a horizontal direction of the material cylinder, and a turntable rotating along the horizontal direction of the material cylinder is arranged on the platform; the cylinder cover is arranged on the turntable and the cylinder cover is caused to swing by a rotating shaft, and the cylinder cover rotates along the horizontal direction of the material cylinder; the rotating shaft is arranged along a height direction of the material cylinder and swings to open and close the cylinder cover at the opening of the material cylinder.

3. The wet granulator according to claim 1, wherein, the material cylinder is provided with a material discharge port, the material discharge port is hinged with a material discharge valve, and the material discharge valve is connected to a material discharge device; the material discharge device comprises a first driving cylinder;

the first driving cylinder comprises a cylinder body, a locking piston rod and a pressure piston rod, wherein the locking piston rod and the pressure piston rod are adapted to slide on the cylinder body; a first end of the locking piston rod is connected to a first end of the pressure piston rod, a second end of the locking piston rod extends out of the cylinder body;

the cylinder body is provided with a first air intake slot at a position next to the pressure piston rod; a first end of the first air intake slot communicates with the pressure piston rod, and a second end of the first air intake slot communicates with an external air delivery device to form a closed air intake cavity; a second end of the pressure piston rod extends out of the cylinder body, and the second end of the pressure piston rod is arranged to press against the material discharge valve; and the cylinder body is provided with a second air intake slot at a position next to the locking piston rod; a first end of the second air intake slot communicates with the locking piston rod, and a second end of the second air intake slot communicates with the external air delivery device to form a closed air delivery cavity; the second end of the locking piston rod is positioned away from the second air intake slot, and a locking base is provided at the second end of the locking piston rod to lock the locking piston rod.

4. The wet granulator according to claim 3, wherein, the locking base is provided with a second through groove; the locking piston rod passes through the second through groove to cause the pressure piston rod to unlock the material discharge valve, and the locking piston rod is arranged in alignment with the second through groove; a locking block slides in the locking base at a position corresponding to the second through groove, and the locking block shields the second through groove when the material discharge valve is locked.

5. The wet granulator according to claim 4, wherein, a slide groove is arranged in the locking base along a direction perpendicular to the second through groove, and the slide groove is arranged along a height direction of the locking base; a second driving cylinder is arranged in the slide groove; an output end of the second driving cylinder is connected to the locking block, and the locking block is adapted to slide along the height direction of the locking base; the second driving cylinder drives the locking block to slide, and causes the locking block to shield the second through groove.

6. The wet granulator according to claim 3, wherein, the material discharge port is arranged between the material cylinder and the side wall of the material cylinder, and a cross section of the material discharge port is in a cone shape with a cone angle of 80°; a central axis of the material discharge port forms an angle of 14.7° relative to the horizontal direction of the material cylinder.

7. The wet granulator according to claim 4, wherein, the material discharge port is arranged between the material cylinder and the side wall of the material cylinder, and a cross section of the material discharge port is in a cone shape with a cone angle of 80°; a central axis of the material discharge port forms an angle of 14.7° relative to the horizontal direction of the material cylinder.

8. The wet granulator according to claim 5, wherein, the material discharge port is arranged between the material cylinder and the side wall of the material cylinder, and a cross section of the material discharge port is in a cone shape with a cone angle of 80°; a central axis of the material discharge port forms an angle of 14.7° relative to the horizontal direction of the material cylinder.

* * * * *